(No Model.) 4 Sheets—Sheet 1.

S. P. TOWNSEND.
LAWN MOWER.

No. 591,435. Patented Oct. 12, 1897.

Witnesses:
Ernest Hafen
Will. A. Barr

Inventor:
Samuel Percy Townsend
by his Attorneys
Howson & Howson (No Model.) 4 Sheets—Sheet 3.
S. P. TOWNSEND.
LAWN MOWER.
No. 591,435. Patented Oct. 12, 1897.
FIG. 3.
FIG. 4.
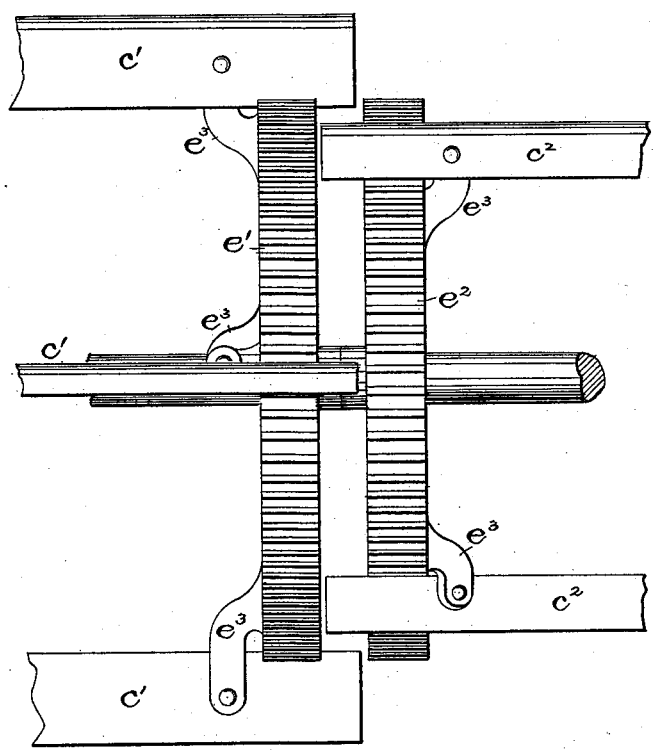
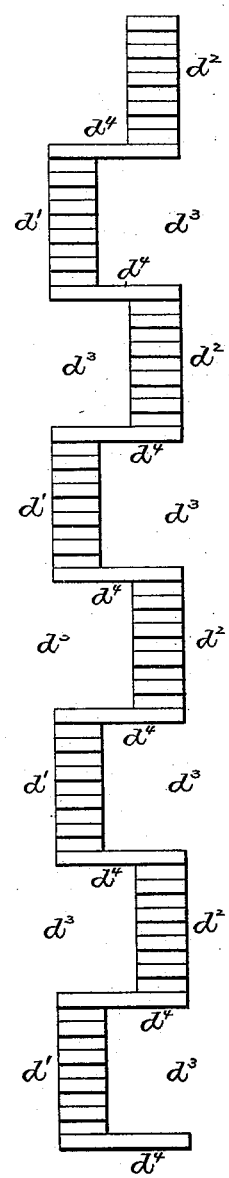
FIG. 7.
Witnesses:
Inventor:
Samuel Percy Townsend
by his Attorneys
Howson & Howson (No Model.)  S. P. TOWNSEND.  4 Sheets—Sheet 4.
LAWN MOWER.

No. 591,435. Patented Oct. 12, 1897.

Witnesses:
Ernest Hafen
Will. A. Bair

Inventor:
Samuel Percy Townsend
by his Attorneys
Howson & Howson

UNITED STATES PATENT OFFICE.

SAMUEL PERCY TOWNSEND, OF PHILADELPHIA, PENNSYLVANIA.

LAWN-MOWER.

SPECIFICATION forming part of Letters Patent No. 591,435, dated October 12, 1897.

Application filed November 21, 1895. Serial No. 569,713. (No model.)

*To all whom it may concern:*

Be it known that I, SAMUEL PERCY TOWNSEND, a citizen of the United States, and a resident of Philadelphia, Pennsylvania, have invented certain Improvements in Lawn-Mowers, of which the following is a specification.

My invention relates to improvements in lawn-mowers; and the object of my invention is to provide means by which the cutting-reel may be driven from a point or points between the ends without interfering with the cutting action thereof, whereby a cutting-reel of any desired width may be used and the driving and supporting mechanism of the mower may be disposed within the lateral limits of said cutting-reel in order to permit the latter to cut closer to fences, walls, or other obstructions than is possible in ordinary machines.

My invention consists in the constructions and combinations of parts hereinafter described, and set forth in the claims.

Figure 1:
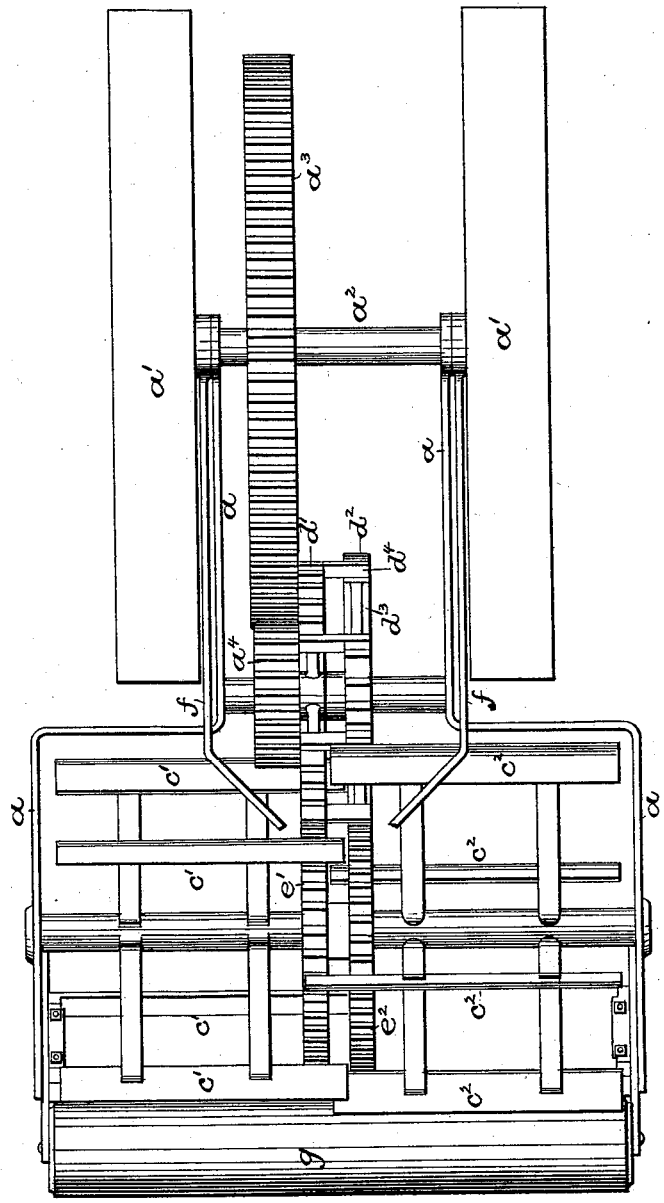
Figure 2:
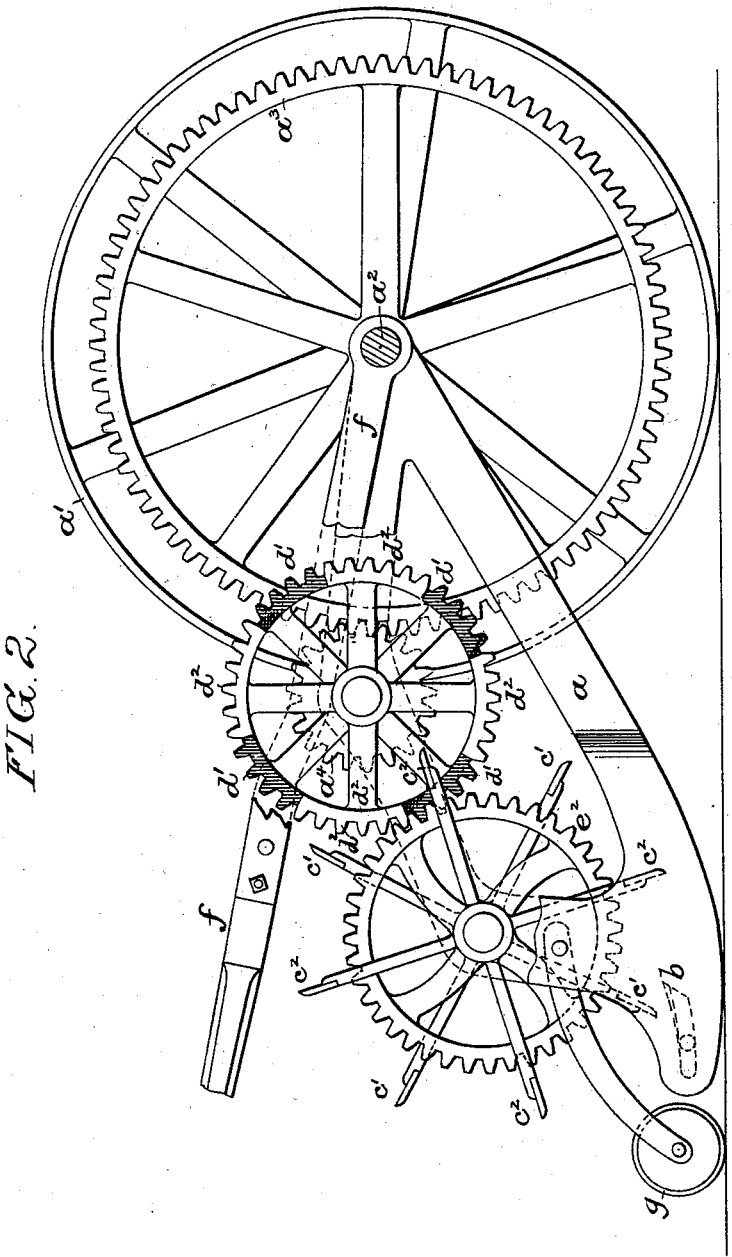
Figure 5:
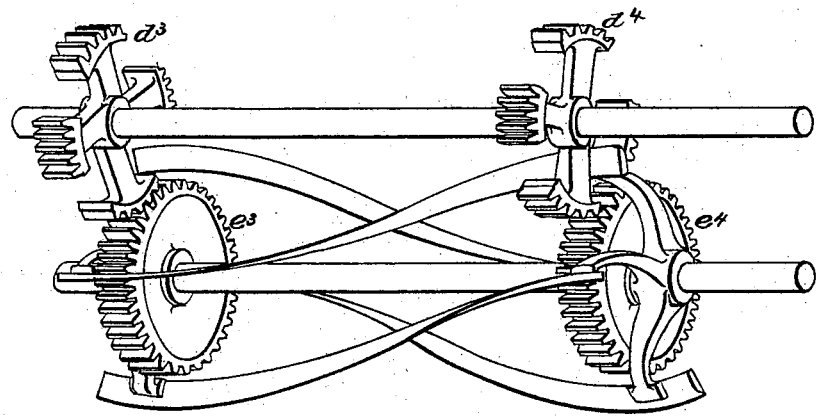
Figure 6:
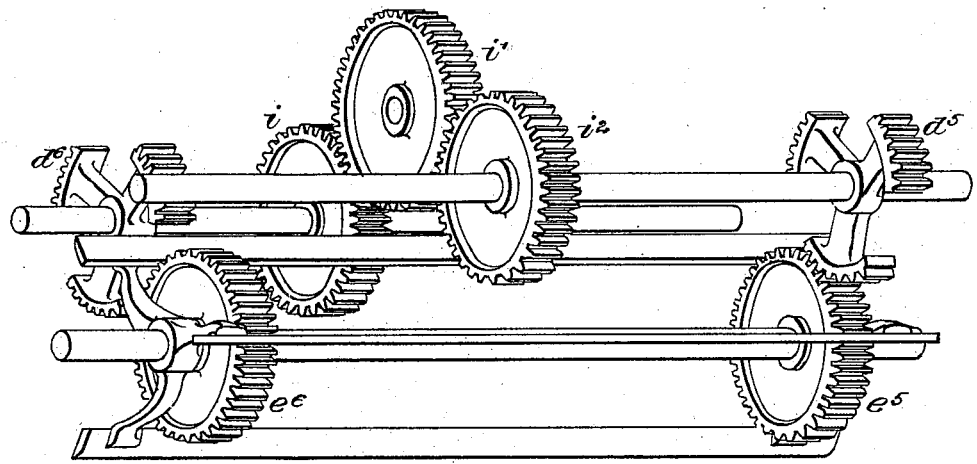

In the accompanying drawings, Figure 1 is a plan view of a lawn-mower embodying my invention. Fig. 2 is a side elevation of the same with some of the parts broken away. Fig. 3 is a plan view of a portion of the reel in detail. Fig. 4 is a diagrammatic view of my improved form of gear. Figs. 5 and 6 are perspective views of a diagrammatic character, illustrating the application of my invention to different forms of reel from that shown in Figs. 1, 2, and 3; and Fig. 7 is a diagram of a character similar to Fig. 4, but illustrating a modified form of gear-wheel.

Like parts are represented by similar letters of reference in the several views.

In the accompanying drawings, $a$ $a$ represent the frame, and $a'$ $a'$ the driving-wheels, which are mounted on a shaft $a^2$, to which they may be connected by the usual pawl-and-ratchet devices, so they will cause the shaft to revolve therewith when moving in a forward direction, but will turn independently of the shaft when moved in a backward direction. This shaft $a^2$ is supported in suitable bearings in the frame $a$ $a$, which frame also supports the stationary cutter $b$ and is provided with bearings for the cutter-reel.

Mounted on the axle $a^2$ is a spur-gear $a^3$, adapted to mesh with a pinion $a^4$, which is formed integral with or is connected with what I term a "duplex segment-gear." This duplex segment-gear is of peculiar construction and consists, essentially, of two gears, each formed in sections, the sections of each part being separated and disposed opposite the spaces in the other part—that is to say, the gear is composed of two series of toothed sections or segments $d'$ $d^2$, and said segments in each series are separated from each other by spaces $d^3$, the segments of one part being arranged opposite the spaces of the other part. In the gear shown in the drawings there is at the end of each segment a connecting-bar $d^4$, which is included in both parts of the gear and forms a tooth in a segment of each series, this construction, however, not being necessary, as the segments of the two series may be entirely disconnected, if desired.

The cutter-reel is made in two parts $c'$ and $c^2$, with the blades of each part arranged alternately in series, the inner ends of each series of blades extending beyond the center of the reel, so that the two sets of blades overlap at this point. Hence in cutting there is no space in the length of the stationary cutter $b$ which does not contact with the blades $c'$ or $c^2$. The blades might, however, simply extend to the central line of the reel without overlapping.

On the reel-shaft is arranged a duplex pinion, which is preferably made in two parts $e'$ and $e^2$ to engage with the respective parts of the duplex segment-gear. The spaces $d^3$ in the latter are so arranged that as the gear revolves these spaces permit the passage of the ends of the blades forming the reel, while the sections of the gear alternately drive said reel through the medium of the two-part pinion $e'$ $e^2$, a section of the portion $d'$ of the gear being in mesh with the pinion $e'$ when a blade of the portion $c^2$ of the reel is passing through a space between the sections of the portion $d^2$ of the gear, and vice versa. It is obvious that two separate pinions $e'$ and $e^2$ may be employed, if desired, both connected to the reel-shaft, or a single pinion having teeth long enough to mesh with both series of sections in the duplex segment-gear may be employed. The reel-blades may be supported on the shaft in any usual manner, with the inner ends of said blades projecting over the driving-gear, as shown. I preferably, however, construct the pinion or pinions $e'\, e^2$ with projecting ears or lugs $e^3$, which take the place of the ordinary arms or spiders for supporting the ends of the reel-blades, as shown in Fig. 3, thus simplifying the construction of the reel.

I have shown the mower herein described as a rear-cut mower, the handle $f$, parts of which are broken away, being connected to the main axle $a^2$. The frame $a\, a$ is also off-set, so that the driving-wheels stand in front of the reel and within the lateral limits of the same, thus securing a very long cutting-surface of said reel without increasing the width of the machine and permitting the cutting of the grass close up to fences, walls, trees, or other obstructions. It is obvious, however, that the construction of the mower may be modified and my improvements may be used upon a mower having either a front or rear cut, as desired. The usual roller $g$ is adjustably secured to the frame $a\, a$, so as to support the same and determine the height of cut.

My improved gearing for driving the reel is not limited of necessity to a mower having a reel with straight overlapping blades. For instance, in Fig. 5 I have illustrated a construction in which the reel has spiral blades continuous from end to end of the reel and in which the two parts $d^3\, d^4$ of the duplex segment-gear and the two parts $e^3\, e^4$ of the reel-pinion are widely separated, so that one set of gears may be in mesh between the blades at one end of the reel, while a blade at the other end of the reel is passing through a space between the segments of the driving-gear.

In Fig. 6 I have shown a construction in which the section $d^5$ of the duplex segment-gear is carried by a shaft independent of that which carries the section $d^6$ of said gear, the two shafts being driven at the same speed and in the same direction by means of the interposed train of gearing $i\, i'\, i^2$, one section, $d^5$, of the segment-gear meshing with a pinion $e^5$ on the reel and the other section, $d^6$, with another pinion $e^6$ thereon. It will be evident that the term "duplex segment-gear" includes the ordinary form of waved or "wabble" gear—such, for instance, as shown in Fig. 7—as the latter would act to drive the duplex pinion of the reel in substantially the same manner as the rack shown in Fig. 4. It is manifest, moreover, that certain teeth of each of the spur-pinions are never in mesh with the teeth of the segment-gear, and these non-acting teeth may, if desired, be omitted for the purpose of lessening the weight of said pinions.

Having thus described my invention, I claim and desire to secure by Letters Patent—

1. In a lawn-mower, the combination of a cutter-reel having a duplex spur-pinion with a duplex segment-gear, having one portion adapted to mesh with one part of said duplex pinion, and the other portion with the other part of the same, the toothed segments and spaces of said duplex segment-gear being so disposed that when a toothed segment of one section of the gear is in mesh with one section of the reel-pinion, a blade of the reel will be passing through a space of the other section of the segment-gear.

2. In a lawn-mower, the combination of a duplex segment-gear having the toothed segments of one section alternating with those of the other section, with a cutter-reel having a duplex pinion for meshing with said duplex segment-gear, and cutting-blades arranged in two series, the blades in one series alternating with those of the other.

3. In a lawn-mower, the combination of a duplex segment-gear having the toothed segments of one section alternating with those of the other section, with a cutter-reel having a duplex pinion adapted to mesh with said duplex segment-gear, and cutting-blades arranged in two series, the blades in one series alternating with those of the other, and the inner ends of the two series of blades overlapping.

4. In a lawn-mower, the combination of a main frame, a cutting-reel, main driving-wheels disposed within the lateral limits of the cutting-blades of the reel, a duplex segment-gear connected to said driving-wheels and having the toothed segments of one section alternating with those of the other section, and a duplex pinion on the cutter-reel adapted to mesh with said duplex segment-gear, substantially as specified.

5. In a lawn-mower, the combination of a cutter-reel having the cutting-blades arranged in two series, the blades in one series alternating with those of the other, a duplex pinion on said cutter-reel, and a duplex segment-gear for driving said pinion, said duplex segment-gear consisting of two series of toothed segments, those of one segment alternating with those of the other, and the end teeth of adjoining segments being united and forming a tooth common to both series, substantially as specified.

6. In a lawn-mower, the combination of a cutter-reel having the blades arranged in two series, a duplex pinion on said cutter-reel having projections to support the inner ends of each series of cutting-blades, and a duplex segment-gear having the toothed segments of one section alternating with those of the other, said duplex segment-gear meshing with the duplex pinion of the cutter-reel, substantially as specified.

In testimony whereof I have signed my name to this specification in the presence of two subscribing witnesses.

SAMUEL PERCY TOWNSEND.

Witnesses:
P. H. REINHARD,
S. H. BENTZ.